United States Patent [19]

Ballu

[11] Patent Number: 5,394,644
[45] Date of Patent: Mar. 7, 1995

[54] DEVICE FOR TYING VINES OR OTHER PLANTS THAT CAN BE TRAINED BY TYING

[75] Inventor: Jean-Louis Ballu, Epernay, France
[73] Assignee: ECB SaRL, France
[21] Appl. No.: 122,401
[22] PCT Filed: Jan. 25, 1993
[86] PCT No.: PCT/FR93/00071
    § 371 Date: Sep. 23, 1993
    § 102(e) Date: Sep. 23, 1993
[87] PCT Pub. No.: WO93/14622
    PCT Pub. Date: Aug. 5, 1993

[30] Foreign Application Priority Data

Jan. 24, 1992 [FR] France ............... 92 00920

[51] Int. Cl.$^6$ ............................................. A01G 17/08
[52] U.S. Cl. ......................................... 47/1.01; 156/468;
                                                156/475; 206/411
[58] Field of Search ............. 57/32; 156/468, 475,
                                156/476, 212; 206/411; 47/44 L

[56] References Cited

U.S. PATENT DOCUMENTS 3,902,956  9/1975  Thompson ............. 206/411
4,945,674  8/1990  Alexandrian ........... 47/44

FOREIGN PATENT DOCUMENTS 2188940  1/1974  France ............... 47/44 L
8801612  1/1990  Netherlands .......... 47/44 L
8501266  3/1985  WIPO ................ 47/44 L Primary Examiner—Henry E. Raduazo
Attorney, Agent, or Firm—Lerner, David, Littenberg, Krumholz & Mentlik

[57] ABSTRACT

Device for tying vines or other plants that can be trained by tying, using adhesive tape.

A flat body (10), the rear portion (11) of which encloses a roll (2) of adhesive tape (20), its front part (12) housing a star-shaped wheel (3) with several spokes (30), mounted in free rotation around a transverse axis (31), with the end (32) of each of the spokes (30) being rounded and of a width that is approximately equal to the width of the adhesive tape (20). Said spokes (30) are surrounded by the side walls (34) separated by spaces (35,), with part of said star-shaped wheel (3) exceeding the length of its spokes on the lower edge (13) of the body (10), and being partially covered by a cog (4) in the arc of a circle, mounted in a pivot around an axis (40) to the front part (12) of the body (10) and held by a spring (41) against the ends (32) of the spokes (30) between the side walls (34). A blade (5) forming a single piece with the cog (4) is intended to cut, at the ends (32) of the spokes (30), the adhesive tape (20), the end of which is placed on the ends (32) of the spokes (30) which protrude beyond the lower edge (13) of the body (10), its non-adhesive side in contact with said ends (32), while the adhesive side of its end (21) is attached to the inside of the cog (4) opposite the end (32) of the spoke (30) that is farthest away from the roll (2) that protrudes over the lower edge (13) of the body (10).

20 Claims, 5 Drawing Sheets

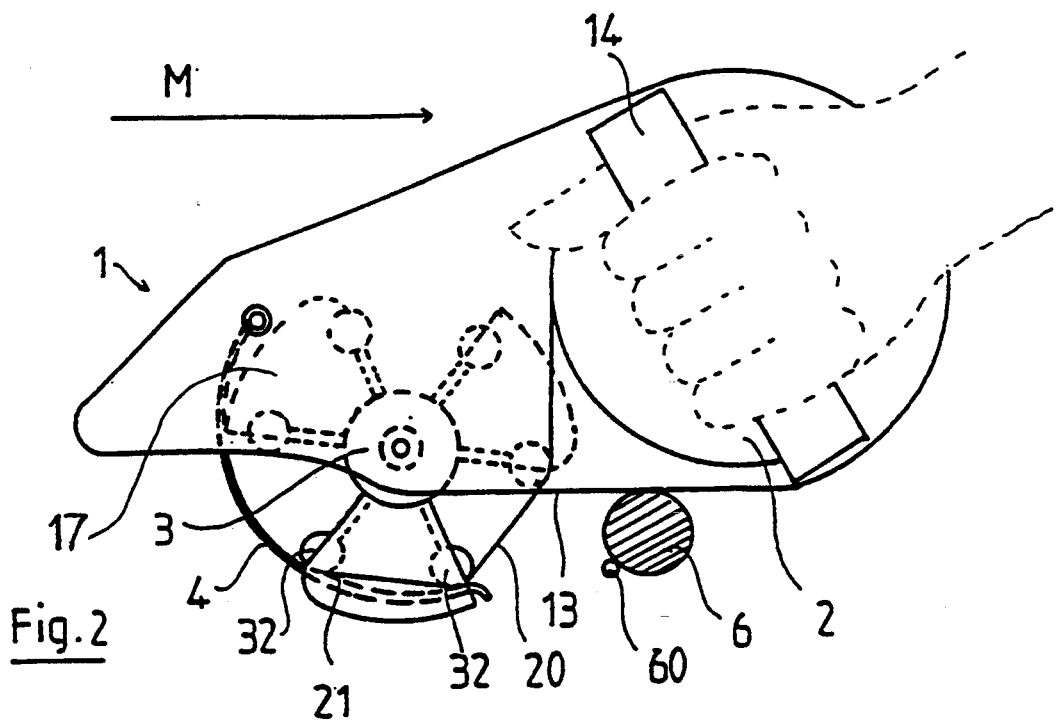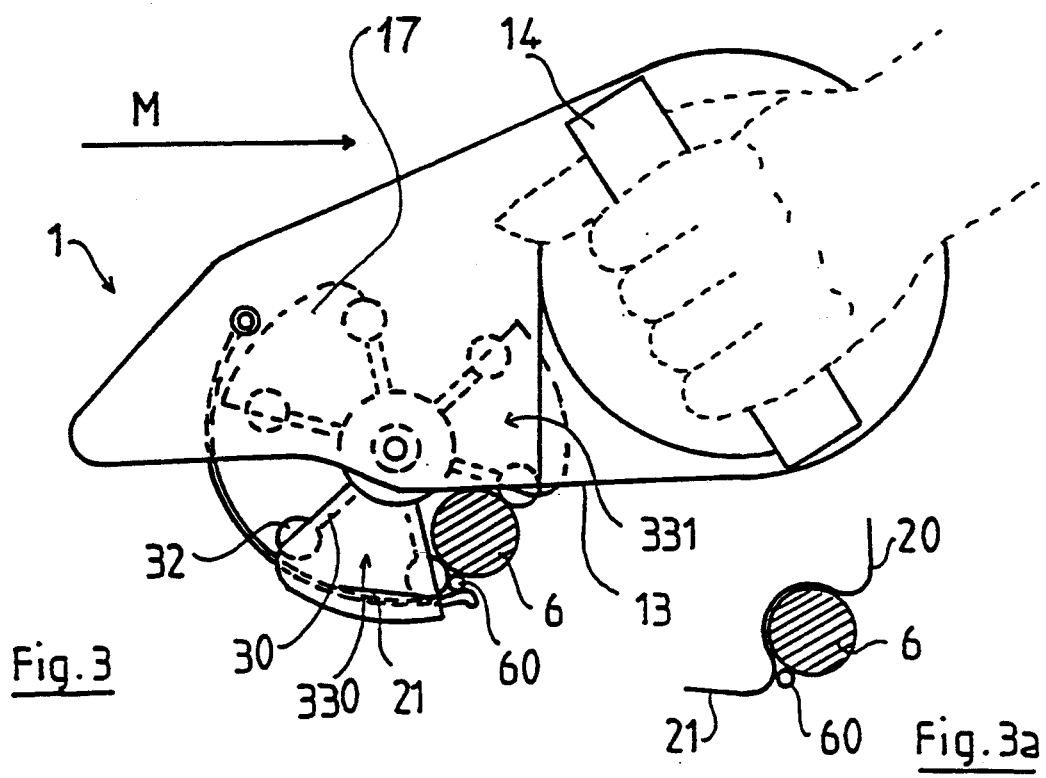

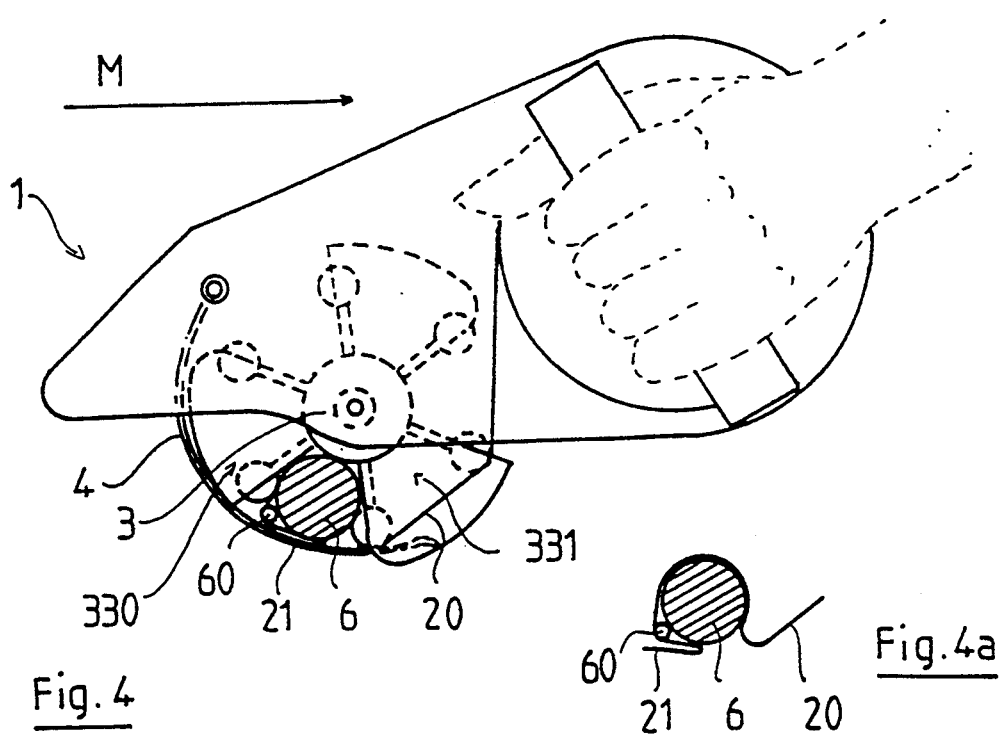
Fig. 4
Fig. 4a
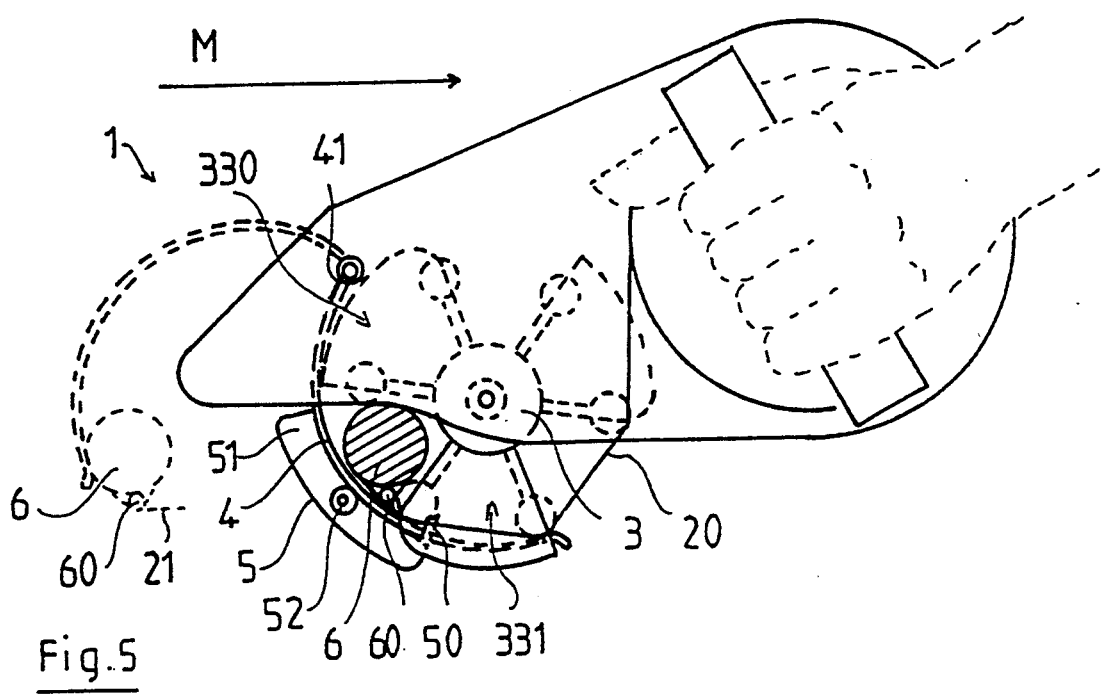
Fig. 5

DEVICE FOR TYING VINES OR OTHER PLANTS THAT CAN BE TRAINED BY TYING

The subject of this invention is a device for tying vines or other plants that can be trained by tying, using adhesive tape.

Tying the vines or other plants consists of placing ties gathering the vine shoots or branches to the training strings in order to maintain and guide the vegetation in its growth.

At the present time various ties are used for tying vines, consisting either of iron wire that may or may not be coated with paper, or of elastic thread or plastic strips that are joined at the ends using a metal fastener.

However, installation of these ties is not easy, and it requires the use of tools that are heavy and difficult to handle. In addition, the fasteners implemented in certain tying techniques might not decompose quickly enough and could fall into the grape crop during the harvest, while ties of iron wire can damage the vegetation or the handler.

There are also devices that permit the tying of various plants using adhesive tape, in particular the one described in document FR-A-2.188.940. However, use of that device is poorly adapted to tying vines and should rather be reserved for temporary use such as, for example, tying up plants in a garden, since it is time-consuming and difficult to handle and requires sufficient clearance around the branches to allow for the entire device to pass through.

This invention intends to solve those problems by proposing a device for tying vines or other plants that can be trained by tying using adhesive tape, since this device is easy to use and can be implemented in a single movement.

The device according to the invention allows, in fact, in a single movement, for the adhesive tape to unroll, surround the branch and the training string, bring together the two ends of the adhesive tape and cut them, all while preparing a new tie.

To that end, the device according to the invention has the characteristics that are presented in the characterization section of the independent claim.

The advantages and characteristics of the device according to the invention are demonstrated more clearly in the description that follows and refers to the attached drawing, which represents two non-restrictive design methods.

IN THE ATTACHED DRAWING

FIGS. 2, 3, 4 and 5 represent partial diagrammatic side views of the same device in the successive stages of placing the tie.

FIG. 3a represents a diagrammatic view of a detail of FIG. 3.

FIG. 4a represents a diagrammatic view of a detail of FIG. 4

Figure 1:
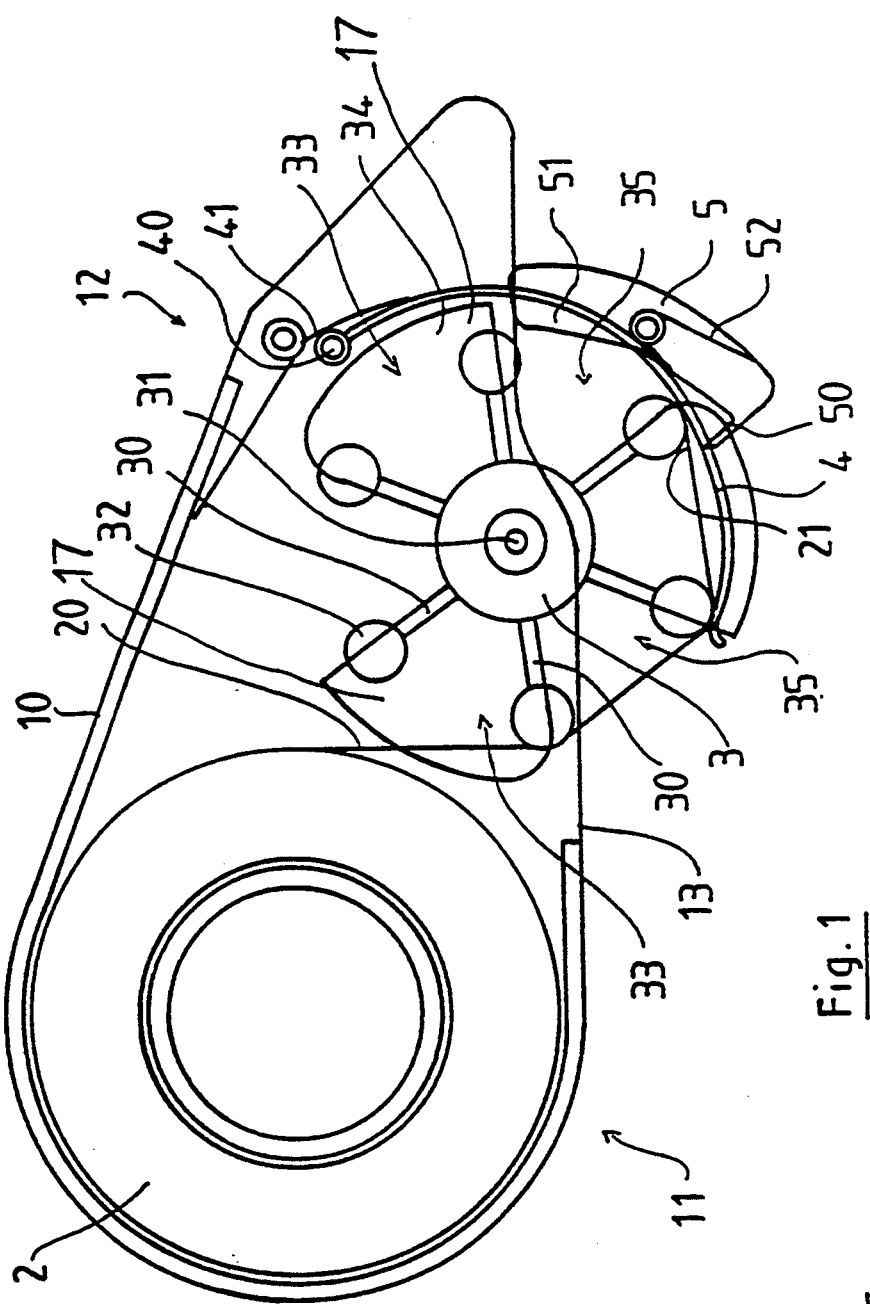
FIG. 1 represents a diagrammatic side view of the first method of design of the device according to the invention.

If you refer to FIG. 1, you can see that a device 1 according to the invention includes a flat body 10, the rear portion 11 of which encloses a roll 2 of adhesive tape 20.

Its front part 12 houses a star-shaped wheel 3 with six spokes 30, mounted in free rotation around a transverse axis 31, with the end of each of the spokes 30 equipped with a small cylinder 32 with an axis parallel to axis 31 of the cover wheel 3 and of a length that is approximately equal to the width of the adhesive tape 20.

The spokes 30 are distributed in three pairs 33, the spokes 30 of one pair 33 being surrounded by the side walls 34 protruding over their ends and separated by the space 35 separating two adjacent spokes 30 from two neighboring pairs 33.

The axis 31 of the star-shaped wheel 3 crosses the body 10 of the device 1 in a crosswise direction at a short distance from its lower edge 13, which runs in a straight line, such that it completely passes by one pair 33 of spokes 30.

A cover 4 in the arc of a circle, jointed at one of its ends 40 on the front part 12 of the body 10 of the device 1, partially covers the part of the star-shaped wheel 3 protruding out from the lower edge 13 of the body 10, and is applied by a spring 41 to the cylindrical ends 32 of the spokes 30, between the side walls 34.

It is clearly illustrated in FIG. 1 as well as in other figures of the present application that the rotatable wheel 3 is separated by the side walls 34 into a plurality of dividers 17 which are separated from each other by the acceptor spaces 35.

Figure 1A:
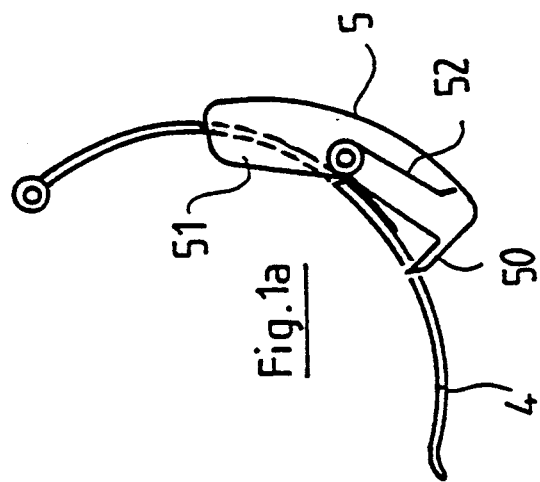
FIG. 1a represents a side view of a detail of FIG. 1, specifically how the adhesive tape is cut after placing the tie.

If you also refer to FIG. 1a you can see that on the cover 4 is fixed a device for cutting the adhesive tape, consisting of a knife 5 rotating by its middle, one of the ends of which has a blade 50 that is capable, under the effect of the rotating movement, of cutting across the cover 4 with a transverse slit, perpendicular to the latter, with the other end 51 of the knife 5 extending over the inside of the arc formed by the cover 4, and being held in position with a low-resistance spring 52.

The adhesive tape 20 is partially unrolled to go over the cylindrical ends 32 of the spokes 30, projecting over the lower edge 13 of the body 10. Its non-adhesive side is in contact with said ends 32 and its end 21 is attached to the inside of the cover 4 opposite the end 32 of the spoke 30 that is farthest away from the roll 2 of the pair 33 that protrudes over the lower edge 13 of the body 10.

If you now refer to FIGS. 2, 3, 4 and 5, you can see that in use device 1, which is held in the hand with a handle 14, is brought up close to the vine shoot 6 to be tied, which is held by hand against the training string 60, so that said vine 6 comes in contact with the lower edge 13 of the body 10 (FIG. 2).

Then (FIG. 3) by exercising a horizontal movement from front to back represented by the arrow M, which slides the lower edge 13 over the vine shoot 6, the latter comes into contact with the adhesive tape 20 and goes into the space 35 that is open between two pairs of spokes 30, respectively 330 and 331. If you refer to FIG. 3a, you can see that at this point in the operation, the adhesive tape 20 is already sticking to half of the circumference of the vine shoot 6.

Continuing movement M, you can see (FIG. 4) that the vine shoot 6 causes the star-shaped wheel 3 to rotate without the cover 4 moving, which has the result, given that the end 21 of the tape 20 does not move on the inside of the cover 4, of allowing the progressive encircling of the vine shoot 6, as seen in FIG. 4a, which movement also causes the adhesive tape 20 to unroll from the roll 2.

At the end of the movement (FIG. 5), you can see that on the one hand, the end 21 of the adhesive tape 20, stuck to the inside of the cover 4, comes unstuck from the traction of the vine 6 and sticks to the adhesive tape 20 brought around by the spoke 30 from the pair of spokes 331, thereby surrounding and tying the vine shoot 6 and the string 60. Then the vine shoot 6 exerts pressure on the end part 51 of the knife 5, and because of the low resistance of the spring 52 compared to spring 41, the knife 5 rotates, the blade 50 cuts across the cover 4 and cuts the adhesive tape 20 in a tangent to the cylindrical end 32 of the spoke 30 which beforehand produced the link between the two adhesive parts of the tape 20, continuation of the movement M causing the cover 4 to pull back and release the tied vine 6 and the string 60.

During pivoting of the cover 4, the newly cut end 21 of the adhesive tape 20 is held on the ends of the spokes of the pair of spokes 331 by the side plates 34, and when the cover 4 comes back under the action of the spring 41, this end 21 of the adhesive tape 20 sticks to the inside of the cover 4. The device 1 is therefore ready to be used again.

Figure 6:
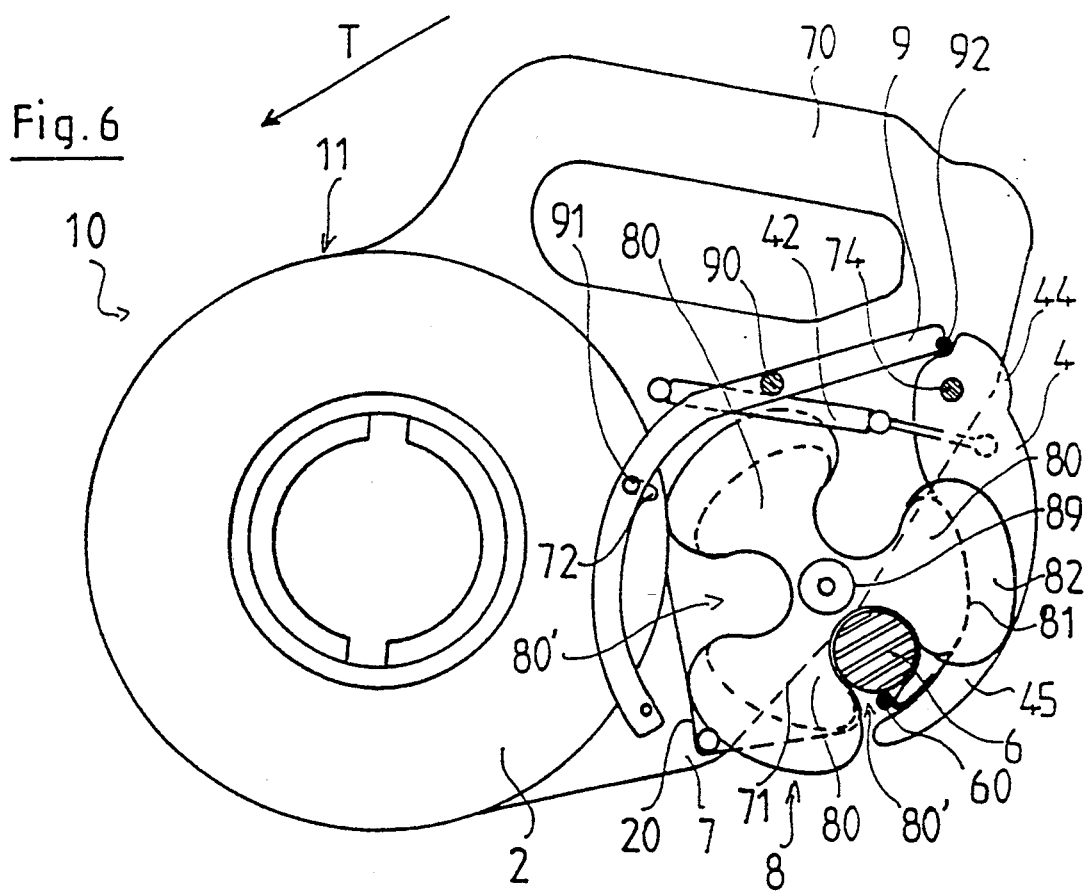
FIG. 6 represents a diagrammatic sectional view of a second design method for the device according to the invention.
Figure 7:
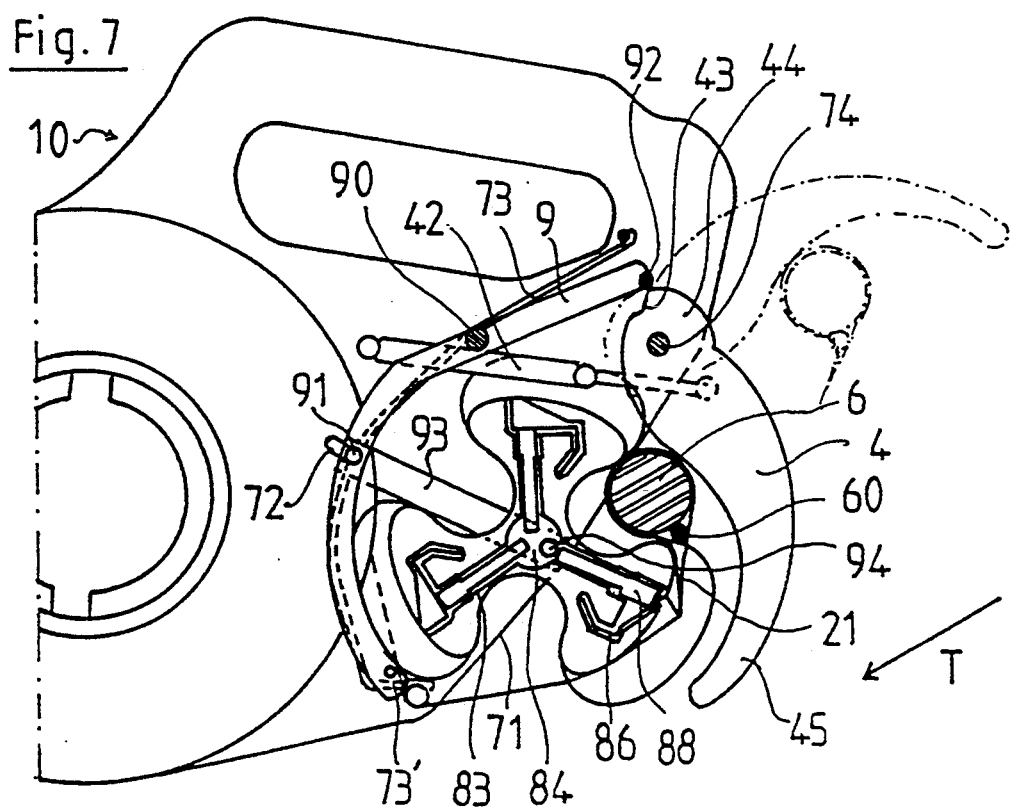
FIG. 7 represents a diagrammatic view of that same device as a tie is being placed.

If you now refer to FIGS. 6 and 7 you can see a second method of design of the device according to the invention.

In this second design method, the device consists of a body 10 that is essentially made up of two side plates 7 joined at the top by a handle 70, between which are located a star-shaped wheel 8, a lever, a cover 4 and a roll 2 of adhesive 20 which will be described in more detail below.

Figure 8:
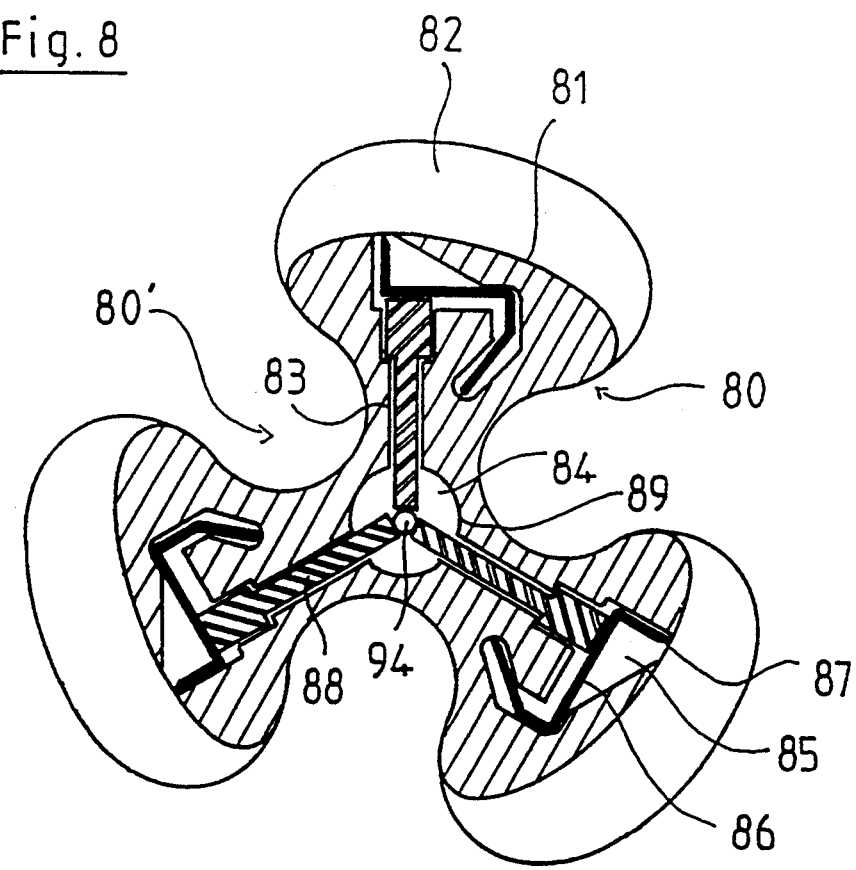
FIG. 8 represents a view, from an overhead section on a larger scale, of a detail of FIG. 7.
Figure 9:
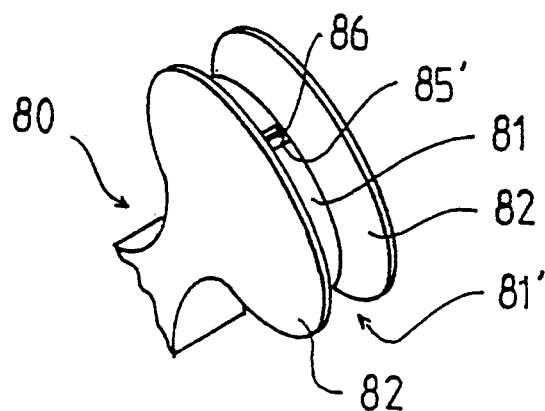
FIG. 9 represents a partial view to scale of a detail of FIG. 6.

By referring also to FIGS. 8 and 9, you can see that the star-shaped wheel 8 has three spokes 80 at 60 degrees, whose ends 81 are enlarged and rounded and bordered on the sides by walls 82, the space 81' between two walls 82 being approximately equal to the width of the adhesive tape 20. The wheel 8 is mounted in rotation around an axis 89 crossing the side plates 7 in a crosswise direction not far from their straight-line edge 71 such that the bottom of the notched part 80' arranged between two spokes 80, which is nearly rounded, is approximately tangential to the straight-line edge 71.

Referring more specifically to FIG. 8, you can see that the star-shaped wheel 8 has in each of the spokes 80 a radial groove 83 coming, on the one hand, from the side of the rotation axis, in a cylindrical opening 84 that is concentric to rotation axis 89, and then, from the side of the end 81 of the spokes 80, in a cavity 85 containing a cutting blade 86, the cutting edge 87 of which is capable of coming out from the end 81 through a slit 85' by applying pressure to a piston 88 sliding in the radial groove 83.

The lever 9, which has one part in a straight line that extends into a curved portion, is mounted so it can pivot around an axis 90, its pivoting being limited by an axis 91 which forms a single piece with it and which passes into the oblong openings 72 made in each of the side plates 7. The lever 9 is kept in a resting position by a spring 73 that is represented by FIG. 7.

The axis 91 that forms a single part with the lever 9 also crosses the end of a rod 93, the other end of which is crosses by an axis 94 passing into the cylindrical opening 84 opposite the ends of the pistons 88.

The cover 4 is mounted so it can pivot in front of and over the star-shaped wheel 8 around an axis 74, positioned near the edges of the side plates 7 and the straight-line end of the lever 9, and it is closed by a spring 42 so that when it is in its resting position it is located on the end 81 of a spoke 80 or partially overlaps two ends 81.

The end of the cover 4 crossed by the axis 74 has around its periphery a hollow portion 43 topped by a hump 44 in the arc of a circle, the center of which merges with the axis 74, the hollow part 43 covering the end 92 of the lever 9 when the cover 4 is in resting position.

Operation of this second-design method is similar to that of the first, in that it involves placing the adhesive 20: the vine shoot 6 and the string 60 brought together are brought in contact in the notch 80' protruding over the body 10, with traction in the direction of the arrow T on the device allowing the vine 6 and the string 60 to be wrapped, bringing them along the edge 71, which has the effect of turning the star-shaped wheel 8. Continuation of the traction T begins, when the vine 6 and the string 60 are tied, the rising of the cover 4, which brings the end 92 of the lever 9 out of the hollow portion 43. The lever rotates and brings up the lower end 73' of the spring 73, which is caused by the rotating to block the adhesive tape 20 and the star-shaped wheel 8 which can no longer turn. Then the rod 93 is moved radially, the axis 94 pushing the piston 88 in the opposite direction, bringing out the cutting edge 87 of the blade 86 to cut the adhesive tape 20. Finally, when the cover 4 is no longer held by the vine 6 and the string 60, it is closed by the spring 42 and goes back to its original position, the end 21 of the adhesive tape 20 sticking to its end 45.

By going back into its original position, the cover 4 releases the end 92 of the lever 9, which also goes back into place, as does spring 73, which results in blocking the wheel 8 and retracting the rod 93, the piston 88 going back into its initial position as a result of the spring effect of the cutting blade 86, such that the tool is ready for another tie.

It stands to reason that this invention would not be limited to the preceding description, which is capable of undergoing certain alterations without departing from the scope of the invention.

I claim:

1. An apparatus for tying plants, comprising
a body having a front end, and a rear end and a lower edge portion, adhesive tape dispensing means mounted at said rear end of said body for dispensing an adhesive tape therefrom, a rotatable wheel mounted at said front end, said rotatable wheel forming a substantially circular path for said adhesive tape and a plurality of acceptor spaces for accepting said plants, space means for dividing said rotatable wheel into a plurality of dividers separated by said acceptor spaces, said apparatus is free of integral portions enclosing said circular path at said lower edge portion,
whereby said adhesive tape being dispensed by moving said apparatus across said plants in a single direction movement.

2. The apparatus of claim 1 wherein said rotatable wheel is mounted on a transverse axis and includes a plurality of spokes projecting outwardly from said transverse axis, each of said plurality of spokes includes adhesive tape contact means at an end thereof distal from said transverse axis thereby forming said substantially circular path for said adhesive tape, said transverse axis of said rotatable wheel being mounted at said front end of said body so that said adhesive tape contact means project beyond said lower edge portion of said body during at least a portion of the rotation of the rotatable wheel, cover means pivotally mounted at said front end of said body, said cover means following said substantially circular path for said adhesive tape means, urging means for urging said cover means towards a rest position proximate to said rotatable wheel for contact against said adhesive tape contact means, blade means mounted transversely to said substantially circular path for said adhesive tape, and blade actuation means for actuating said blade means to cut said adhesive tape.

3. The apparatus of claim 2 wherein said spacer means comprises a plurality of side wall portions encompassing at least an adjacent pair of said plurality of spokes.

4. The apparatus of claim 2 wherein said spacer means comprises a plurality of side wall portions corresponding to each of said plurality of spokes, said plurality of side wall portions having a shape whereby said plurality of acceptor spaces are adapted for receiving said plants.

5. The apparatus of claim 4 wherein said plurality of side wall portions extend beyond said adhesive tape contact means.

6. The apparatus of claim 1 wherein said plants comprise vines.

7. The apparatus of claim 1 wherein said adhesive tape contact means comprises a rounded surface having a width substantially equal to the width of said adhesive tape.

8. The apparatus of claim 1 wherein said urging means comprises spring means.

9. The apparatus of claim 1 wherein said blade means is affixed to said cover means.

10. The apparatus of claim 1 wherein said blade means comprises a plurality of blade members.

11. The apparatus of claim 10 wherein said plurality of blade members are mounted within each of said plurality of spokes.

12. The apparatus of claim 9 wherein said blade means includes a blade body pivotally mounted with respect to said cover means, said blade body including a front end and a rear end, a blade mounted in said front end of said blade body for transverse cutting of said adhesive tape, protrusion means extending from said rear end of said blade body, said protrusion means extending inwardly of said cover means whereby a plant located in one of said acceptor spaces can cause rotation of said blade body by impacting against said protrusion means.

13. The apparatus of claim 11 wherein each of said plurality of spokes includes radial groove means extending from an opening corresponding to said transverse axis to said adhesive tape contact means, thus producing a blade opening at said adhesive tape contact means, and a cavity at the end of said radial groove corresponding to said adhesive tape contact means, each of said plurality of blade members comprising a blade mounted within said cavity for transverse movement of said blade through said blade opening.

14. The apparatus of claim 13 wherein said blade activation means comprises a piston mounted within said radial groove means for slidable movement therein, said piston having a first end at a location corresponding to said transverse axis and a second end in contact with said blade mounted within said cavity whereby upon slidable movement of said piston within said radial groove means, said blade is urged to move transversely through said blade opening to cut said adhesive tape, lever means pivotally mounted on said body, said lever means having a first end and a second end and normally being in a rest position, and rod means mounted between said lever means at a location between said first and second ends thereof and said first end of said piston whereby upon pivotal movement of said lever means out of said rest position said lever means causes said rod means to move translationally and thereby move said second end of said piston means so as to move said blade through said blade opening.

15. The apparatus of claim 14 wherein said cover means includes a first end and a second end, said cover means being pivotally mounted on said first end of said body at said first end of said cover means, said first end of said cover means including indentation means for recovering said first end of said lever means when said cover means is in said rest position and actuating means for pivotally actuating said lever means when said cover means is rotated out of said rest position.

16. The apparatus of claim 14 including lever urging means for urging said lever means into said rest position, said lever urging means extending to said second end of said lever means, said second end of said lever means being located adjacent to said circular path for said adhesive tape, whereby upon pivotal movement of said lever means out of said rest position said circular path for said adhesive tape is interrupted and said adhesive tape contact means are hindered from further rotation.

17. An apparatus for tying plants, comprising:
a body having a front end, a rear end and a lower edge portion, adhesive tape dispensing means mounted at said rear end of said body for dispensing an adhesive tape therefrom, a rotatable wheel mounted at said front end, said rotatable wheel forming a substantially circular path for said adhesive tape and a plurality of acceptor spaces for accepting said plants, said apparatus being free of integral portions enclosing said circular path at said lower edge portion,
whereby said adhesive tape being dispensed by moving said apparatus across said plants in a single direction movement.

18. The apparatus of claim 17 wherein said rotatable wheel is mounted on a transverse axis at said front end of the body, and includes a plurality of spokes projecting outwardly from said transverse axis, each of said plurality of spokes including adhesive tape contact means at an end thereof distal from said transverse axis thereby forming said circular path for said adhesive tape, space means for dividing said rotatable wheel into a plurality of dividers separated by said acceptor spaces, said adhesive tape contact means project beyond said lower edge portion of said body during at least a portion of said rotation of the rotatable wheel, cover means pivotally mounted at said front end of said body, said cover means following said circular path for said adhesive means, urging means for urging said cover means towards said rotatable wheel for contacting against said adhesive tape contact means, blade means mounted transversely to said substantially circular path for said adhesive tape and blade actuation means for activating said blade means transversely to said circular path and thereby cutting said adhesive tape.

19. The apparatus of the claim 18 wherein said space means comprises a plurality of side wall portions encompassing at least an adjacent pair of said plurality of spokes.

20. The apparatus of claim 19 wherein said blade means comprises a plurality of blade members.

* * * * *

UNITED STATES PATENT AND TRADEMARK OFFICE
CERTIFICATE OF CORRECTION

PATENT NO. : 5,394,644
DATED : March 7, 1995
INVENTOR(S) : Ballu, Jean-Louis

It is certified that error appears in the above-indentified patent and that said Letters Patent is hereby corrected as shown below:

Column 5, line 35, "1" should read --2--.

Column 5, line 37, "1" should read --2--.

Column 5, line 41, "1" should read --2--.

Column 5, line 43, "1" should read --2--.

Column 5, line 45, "1" should read --2--.

Signed and Sealed this

Second Day of April, 1996

*Attest:*

BRUCE LEHMAN

*Attesting Officer*     *Commissioner of Patents and Trademarks*